(12) United States Patent
Madhani et al.

(10) Patent No.: US 10,476,696 B2
(45) Date of Patent: Nov. 12, 2019

(54) MONITORING USAGE AND ADJUSTING OPERATIONAL CHARACTERISTICS OF PHYSICAL ASSETS

(71) Applicant: FMR LLC, Boston, MA (US)

(72) Inventors: Sunil Madhani, Cary, NC (US); Valentine Foti, Hopkinton, MA (US); William Metzler, Smithfield, RI (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/815,328

(22) Filed: Nov. 16, 2017

(65) Prior Publication Data

US 2019/0149354 A1 May 16, 2019

(51) Int. Cl.
*H04L 12/28* (2006.01)
*G06F 1/26* (2006.01)

(52) U.S. Cl.
CPC ............ *H04L 12/2825* (2013.01); *G06F 1/26* (2013.01); *H04L 2012/285* (2013.01)

(58) Field of Classification Search
None
See application file for complete search history.

(56) References Cited

U.S. PATENT DOCUMENTS

| 8,577,711 | B2* | 11/2013 | Korecki | G06Q 10/087 |
| | | | | 705/7.15 |
| 8,688,375 | B2* | 4/2014 | Funk | G01C 21/165 |
| | | | | 340/995.19 |
| 9,027,230 | B2* | 5/2015 | Swift | G01K 7/183 |
| | | | | 29/610.1 |
| 9,245,229 | B2* | 1/2016 | Fadell | G05B 15/02 |
| 9,442,017 | B2* | 9/2016 | Read | G01J 5/0025 |
| 2005/0130652 | A1* | 6/2005 | O'Toole | G06Q 10/08 |
| | | | | 455/432.2 |
| 2005/0222933 | A1* | 10/2005 | Wesby | G06Q 40/00 |
| | | | | 705/36 R |

(Continued)

OTHER PUBLICATIONS (C1) Herman Miller Space Utilization Service brochure, "Reduce your real estate costs by up to 20% and optimize your office environments," copyright 2010, 2 pages.

(Continued)

*Primary Examiner* — Tung S Lau
(74) *Attorney, Agent, or Firm* — Proskauer Rose LLP

(57) ABSTRACT

Methods and apparatuses are described for monitoring usage and adjusting operational characteristics of physical assets. Asset sensors capture temperature data and x-y-z coordinate displacement data associated with a physical asset. A reference sensor captures temperature data of a defined physical area. For each asset sensor, a server computing device monitors the temperature data and the x-y-z coordinate displacement data. The server applies triggers to the temperature data and the displacement data to determine whether a change event occurred. The server records the temperature data and the displacement data when a change event occurred for the physical asset. The server generates instructions comprising a change to: an operational state or an availability of the physical asset. The server transmits the instructions to a remote device associated with the physical asset. The remote device executes the instructions to change: the operational state or the availability of the physical asset.

20 Claims, 3 Drawing Sheets

(56) References Cited

U.S. PATENT DOCUMENTS

| | | | | |
|---|---|---|---|---|
| 2007/0247366 | A1* | 10/2007 | Smith | G01S 5/021 |
| | | | | 342/464 |
| 2008/0109289 | A1* | 5/2008 | Vivadelli | G06Q 10/02 |
| | | | | 705/314 |
| 2009/0199994 | A1* | 8/2009 | Amano | C09K 5/063 |
| | | | | 165/10 |
| 2014/0244051 | A1* | 8/2014 | Rollins | B01F 3/04078 |
| | | | | 700/282 |
| 2015/0120360 | A1* | 4/2015 | Adriaenssens | G01V 8/10 |
| | | | | 705/7.16 |
| 2016/0069624 | A1* | 3/2016 | Rollins | F04D 25/028 |
| | | | | 415/122.1 |
| 2016/0183687 | A1* | 6/2016 | Hoyt | A47C 31/126 |
| | | | | 297/217.2 |
| 2017/0109829 | A1 | 4/2017 | Amigo et al. | |
| 2017/0109892 | A1* | 4/2017 | Wu | G06T 7/0081 |
| 2018/0040939 | A1* | 2/2018 | Rokhsaz | G06K 19/07788 |
| 2018/0059717 | A1* | 3/2018 | Kim | G06F 1/1626 |
| 2018/0262891 | A1* | 9/2018 | Wu | H04W 4/00 |

OTHER PUBLICATIONS (C2) He et al., "Smart Chair: An Internet of Things Case Study for a Capstone Research Project," Int'l Conf. Frontiers in Education: CS and CE (FECS'15), pp. 155-161, dated 2015.

* cited by examiner

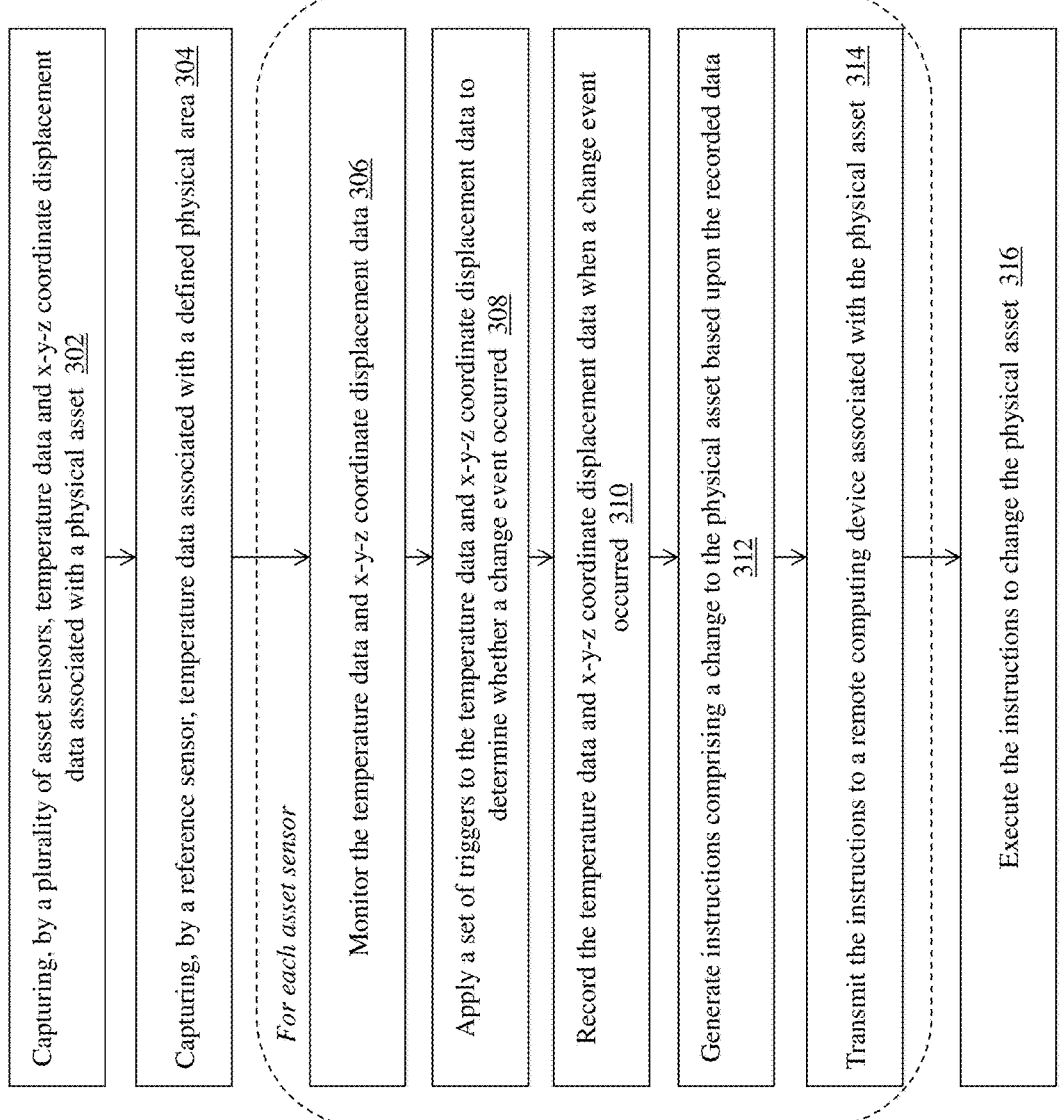

MONITORING USAGE AND ADJUSTING OPERATIONAL CHARACTERISTICS OF PHYSICAL ASSETS

TECHNICAL FIELD

This application relates generally to methods and apparatuses, including computer program products, for monitoring usage and adjusting operational characteristics of physical assets.

BACKGROUND

Tracking usage and operation of physical assets (e.g., machines, appliances, furniture), and having the capability to automatically adjust operational settings of such assets, has become an increasing concern for the reliable and continued operation of such assets—as well as optimizing the availability of assets that are frequently used versus minimizing, disabling, or removing assets that do not have much use. In the last several years, some physical assets have become equipped with smart technology—such as processors, memory, networking components and the like—that enable the functionality and operation of the assets to be controlled. However, such technology is not yet capable of capturing actual manipulation and usage of the corresponding physical asset by users (e.g., determining whether is a person touching or moving the asset during operation). In addition, there is no way to capture such usage of physical assets that do not have such smart technology embedded within.

SUMMARY

Therefore, what is needed are methods and systems for monitoring usage and adjusting operational characteristics of physical assets. The techniques described herein provide the specific technical advantage over existing systems of providing a distributed network of sensors attached to physical assets that record temperature and displacement (which indicate usage) when certain event criteria are met. The techniques further enable analysis of the temperature and displacement data to generate actionable, programmatic change instructions that, when transmitted to remote computing devices coupled to the physical assets, are executed to change the operation of such assets based upon the relevant temperature and displacement data.

The invention, in one aspect, features a system for monitoring usage and adjusting operational characteristics of physical assets. The system comprises a plurality of asset sensor devices, each asset sensor device attached to a physical asset in a defined physical area and capturing temperature data and x-y-z coordinate displacement data associated with the physical asset. The system further comprises at least one reference sensor device, the reference sensor device capturing temperature data of the defined physical area. The system further comprises a server computing device coupled to the plurality of asset sensor devices and the at least one reference sensor device. For each asset sensor device, the server computing device monitors the captured temperature data and the captured x-y-z coordinate displacement data of the asset sensor device. The server computing device applies a set of triggers to the captured temperature data and the captured x-y-z coordinate displacement data of the asset sensor device to determine whether a change event occurred for the physical asset, the change event associated with one trigger in the set of triggers. The server computing device records the temperature data and the x-y-z coordinate displacement data of the asset sensor device when a change event occurred for the physical asset, the recording continuing until the temperature data associated with the physical asset matches the temperature data associated with the defined physical area and the x-y-z coordinate displacement data associated with the physical asset returns to zero. The server computing device generates instructions comprising a change to at least one of: an operational state of the physical asset or an availability of the physical asset based upon the recorded temperature data and the recorded x-y-z coordinate displacement data. The server computing device transmits the instructions to a remote computing device associated with the physical asset. The remote computing device executes the instructions to change at least one of: the operational state of the physical asset or the availability of the physical asset.

The invention, in another aspect, features a computerized method of monitoring usage and adjusting operational characteristics of physical assets. A plurality of asset sensor devices, each attached to a physical asset in a defined physical area, captures temperature data and x-y-z coordinate displacement data associated with the physical asset. At least one reference sensor device captures temperature data of the defined physical area. For each asset sensor device, a server computing device, coupled to the plurality of asset sensor devices and the at least one reference sensor device, monitors the captured temperature data and the captured x-y-z coordinate displacement data of the asset sensor device. The server computing device applies a set of triggers to the captured temperature data and the captured x-y-z coordinate displacement data of the asset sensor device to determine whether a change event occurred for the physical asset, the change event associated with one trigger in the set of triggers. The server computing device records the temperature data and the x-y-z coordinate displacement data of the asset sensor device when a change event occurred for the physical asset, the recording continuing until the temperature data associated with the physical asset matches the temperature data associated with the defined physical area and the x-y-z coordinate displacement data associated with the physical asset returns to zero. The server computing device generates instructions comprising a change to at least one of: an operational state of the physical asset or an availability of the physical asset based upon the recorded temperature data and the recorded x-y-z coordinate displacement data. The server computing device transmits the instructions to a remote computing device associated with the physical asset. The remote computing device executes the instructions to change at least one of: the operational state of the physical asset or the availability of the physical asset.

Any of the above aspects can include one or more of the following features. In some embodiments, the plurality of asset sensor devices each comprises a wireless beacon with a motion sensor and a temperature sensor. In some embodiments, each asset sensor device is programmed with base x-y-z coordinates and the x-y-z coordinate displacement data corresponds to a change in x-y-z coordinates of the asset sensor device from the base x-y-z coordinates. In some embodiments, the base x-y-z coordinates are zero and the x-y-z coordinate displacement data is x-y-z coordinates with at least one non-zero value representing the change in x-y-z coordinates of the asset sensor device from the base x-y-z coordinates. In some embodiments, the server computing device captures temperature data associated with the defined physical area from the reference sensor device at the same time as capturing temperature data associated with the physical asset from the asset sensor device.

In some embodiments, the server computing device stores the set of triggers in a database, each trigger comprising a plurality of binary values, each binary value corresponding to one of: a change in temperature of the physical asset, a change in x-coordinate displacement of the physical asset, a change in y-coordinate displacement of the physical asset, or a change in z-coordinate displacement of the physical asset. In some embodiments, applying the set of triggers to the captured temperature data and the captured x-y-z coordinate displacement data of the asset sensor device comprises: determining whether a change in temperature exists for the physical asset based upon the captured temperature data; determining whether a change in x-coordinate displacement exists for the physical asset based upon the captured x-y-z coordinate displacement data; determining whether a change in y-coordinate displacement exists for the physical asset based upon the captured x-y-z coordinate displacement data; determining whether a change in z-coordinate displacement exists for the physical asset based upon the captured x-y-z coordinate displacement data; generating a binary value for each of the change in temperature determination, the change in x-coordinate displacement determination, the change in y-coordinate displacement determination, and the change in z-coordinate displacement determination; comparing the generated binary values to the plurality of binary values for each trigger in the set of triggers to determine whether the binary values of one trigger matches the generated binary values; and determining that a change event occurred for the physical asset when the generated binary values matches the binary values of one trigger.

In some embodiments, recording the temperature data and the x-y-z coordinate displacement data of the asset sensor device when a change event occurred for the physical asset comprises: storing a current temperature and current x-y-z coordinates of the asset sensor device in a database at each of a plurality of predetermined time intervals. In some embodiments, the plurality of predetermined time intervals comprises real-time storing of the current temperature and current x-y-z coordinates of the asset sensor device.

In some embodiments, the server computing device generates an alert associated with the generated instructions and transmits the alert to a mobile computing device of a user to notify the user of the change to at least one of: the operational state of the physical asset or the availability of the physical asset. In some embodiments, the remote computing device changes the operational state of the physical asset by adjusting one or more operational settings of the physical asset based upon the instructions. In some embodiments, the remote computing device changes a power state of the physical asset based upon the instructions.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method of monitoring usage and adjusting operational characteristics of physical assets.

DETAILED DESCRIPTION

Figure 1:
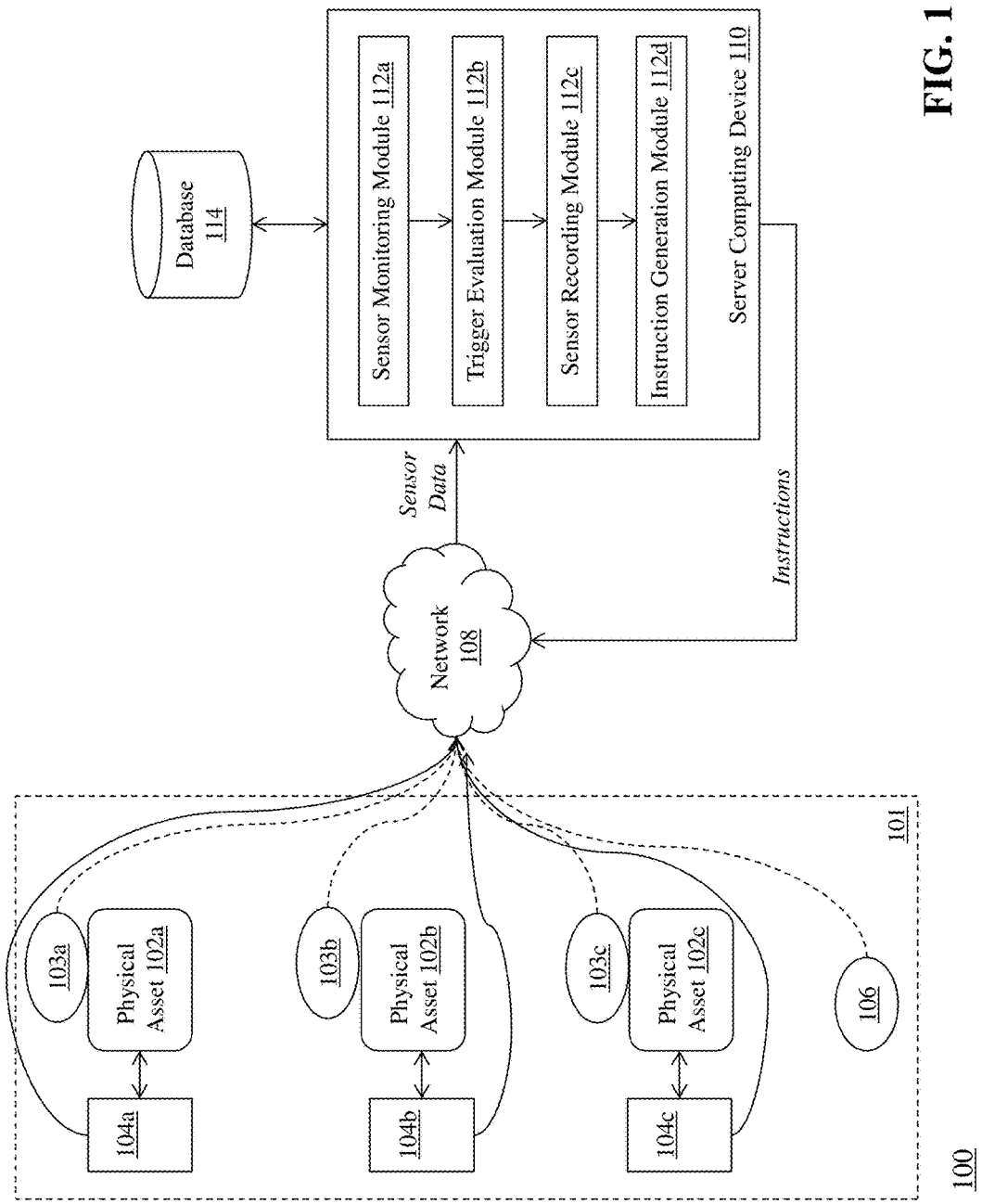
FIG. 1 is a block diagram of a system for monitoring usage and adjusting operational characteristics of physical assets.

FIG. 1 is a block diagram of a system 100 for monitoring usage and adjusting operational characteristics of physical assets. The system 100 includes a plurality of physical assets 102a-102c disposed in a predetermined physical area 101, and each physical asset 102a-102c has an asset sensor device 103a-103b attached thereto. Also, each physical asset 102a-102c is coupled to a corresponding computing device 104a-104c. The system 100 further includes a reference sensor device 106 that is positioned within the predetermined physical area 101 in proximity to the physical assets 102a-102c. The asset sensor devices 103a-103c, the computing devices 104a-104c, and the reference sensor device 106 are each connected to a server computing device 110 via a communications network 108. The server computing device 110 includes a sensor monitoring module 112a, a trigger evaluation module 112b, a sensor recording module 112c, and an instruction generation module 112d. The server computing device 110 is coupled to a database 114.

Each physical asset 102a-102c generally comprises an apparatus (such as a machine, an IoT device, electronics, hardware, and the like) that is operable by one or more users working in the predetermined physical area 101. Exemplary physical assets 102a-102c include, but are not limited to, office hardware (e.g., copiers, fax machines, computers), appliances (e.g., coffee machines, refrigerators), vending machines, communications devices (e.g., phones, conferencing equipment), smart furniture, and the like. It should be appreciated that other types of physical assets can be contemplated for use with the systems and methods described herein. Each physical asset 102a-102c can be programmed or configured according to one or more operational settings that relate to the functionality of the asset. In addition, the availability of each physical asset 102a-102c can be controlled (e.g., power on, power off).

Figure 2:
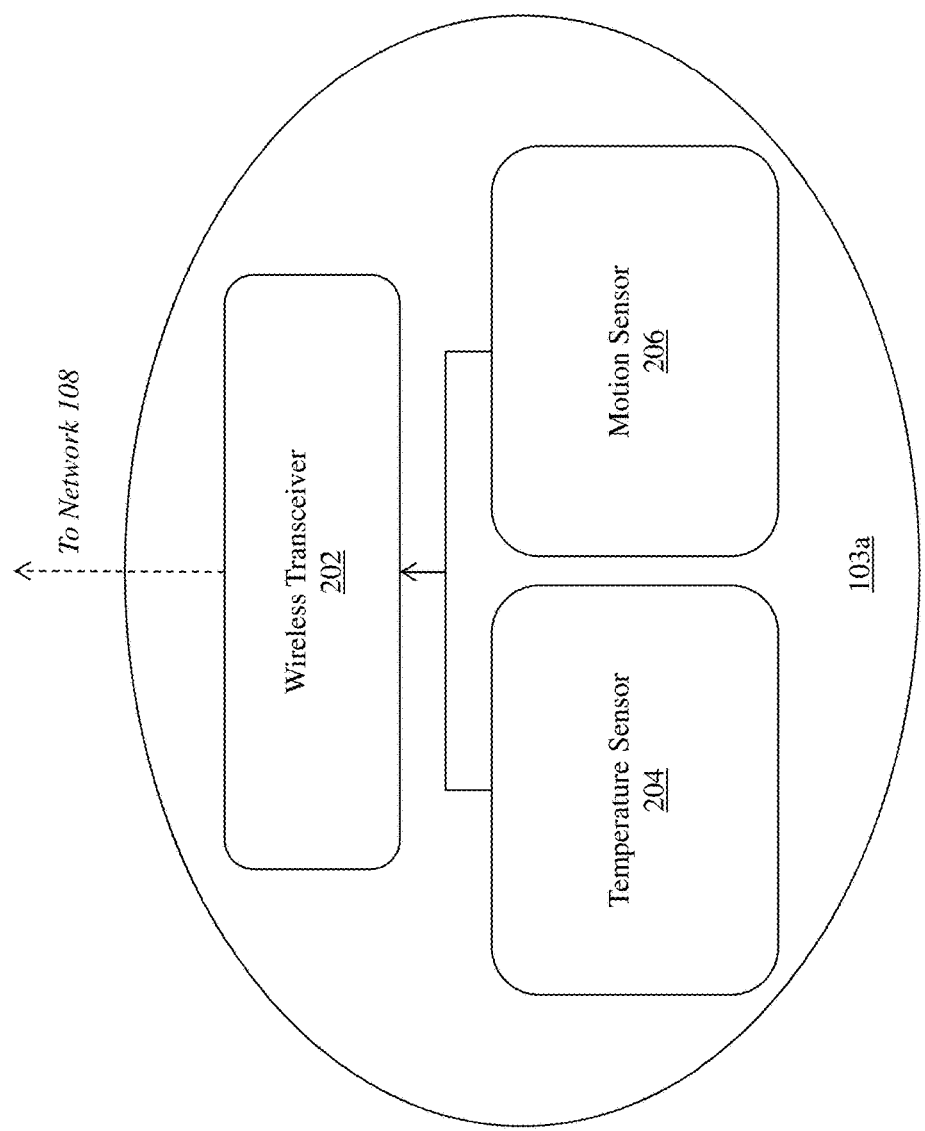
FIG. 2 is a detailed block diagram of an asset sensor device.

The asset sensor devices 103a-103c attached to the physical assets 102a-102c comprise a device (shown in FIG. 2) including a wireless transceiver 202 that enables communication with network 108 (e.g., via Bluetooth™ or other similar communications protocol), a temperature sensor 204 configured to capture a temperature associated with the physical asset, and a motion sensor 206 configured to capture a displacement associated with the physical asset. The temperature sensor 204 can capture an interior temperature and/or exterior temperature of the physical asset, which may indicate whether the physical asset is being operated or otherwise used. The motion sensor 206 can capture a displacement of the physical asset in x-y-z coordinates. In one embodiment, the motion sensor 206 can be configured with a base location of 0,0,0 as its location when the physical asset is not in use. When the physical asset is in use, the motion sensor experiences at least some displacement due to operation of the asset, and the displacement is captured as a difference in the x and y coordinates from the base location. For example, if a lever moves four inches on the physical asset where the asset sensor device is attached, the motion sensor records a displacement in the x-, y-, and/or z-coordinates due to the movement. It should be appreciated that although FIG. 1 depicts one asset sensor device for each physical asset 102a, the system 100 can be configured to attach a plurality of asset sensor devices to each physical asset—in order to capture different operations or uses of various components of the asset.

Each physical asset 102a-102c is also coupled to a computing device 104a-104c (e.g., a processor, a mobile device, or other similar device) that is configured to control and/or adjust one or more operational settings of the physical asset. For example, the computing device can be a processor that is embedded in the physical asset to execute instructions that control operation of the physical asset. In another example, the computing device can be a mobile device that is wirelessly coupled to the physical asset for controlling and/or adjusting one or more operational settings of the physical asset. The computing device further comprises communications components that enable the computing device to communicate with the network 108. In some embodiments, the computing device can be embedded within the asset sensor device, which is then communicatively coupled to the corresponding physical asset.

As mentioned above, each of the asset sensor devices 103a-103c and the computing devices 104a-104c is connected to the communications network 108 in order to communicate with the server computing device 110 to provide input and receive output relating to the process of identifying and mitigating high-risk database queries through ranked variance analysis as described herein. In some embodiments, the client computing device 102 can be coupled to a display device for, e.g., providing a detailed graphical user interface (GUI) that receives input for and presents output resulting from the methods and systems described herein.

Exemplary client devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communications network 104 enables the other components of the system 100 to communicate with each other in order to perform the process of monitoring usage and adjusting operational characteristics of physical assets as described herein. The network 108 may be a local network, such as a LAN, or a wide area network, such as the Internet and/or a cellular network. In some embodiments, the network 108 is comprised of several discrete networks and/or sub-networks (e.g., cellular to Internet) that enable the components of the system 100 to communicate with each other.

The server computing device 110 is a combination of hardware and software modules that includes specialized hardware and/or software modules that execute on a processor and interact with memory modules of the server computing device 110 to perform functions for monitoring usage and adjusting operational characteristics of physical assets as described herein. The server computing device 106 includes a sensor monitoring module 112a, a trigger evaluation module 112b, a sensor recording module 112c, and an instruction generation module 112d (as mentioned above) that execute on and/or interact with the processor of the server computing device 110.

In some embodiments, the sensor monitoring module 112a, the trigger evaluation module 112b, the sensor recording module 112c, and the instruction generation module 112d are specialized sets of computer software instructions programmed onto one or more dedicated processors in the server computing device 110 and can include specifically-designated memory locations and/or registers for executing the specialized computer software instructions. Although the modules 112a-112c are shown in FIG. 1 as executing within the same server computing device 110, in some embodiments the functionality of the modules 112a-112c can be distributed among a plurality of server computing devices. As shown in FIG. 1, the server computing device 110 enables the modules 112a-112c to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 112a-112c is described in detail below.

The database 114 is a computing device (or in some embodiments, a set of computing devices) coupled to the server computing device 110 and is configured to receive, generate, and store specific segments of data relating to the process of monitoring usage and adjusting operational characteristics of physical assets as described herein. In some embodiments, all or a portion of the database 114 can be integrated with the server computing device 110 or be located on a separate computing device or devices. The database 114 can comprise one or more databases configured to store portions of data used by the other components of the system 100, as will be described in greater detail below. An exemplary database 114 is MySQL™ available from Oracle Corp. of Redwood City, Calif.

FIG. 3 is a flow diagram of a computerized method 300 of monitoring usage and adjusting operational characteristics of physical assets, using the system 100 of FIG. 1. As mentioned above, the plurality of asset sensor devices 103a-103c are attached to corresponding physical assets 102a-102c in order to measure temperature and displacement associated with the physical asset. Each asset sensor device 103a-103c captures (302) temperature data and x-y-z coordinate displacement data associated with the respective physical asset 102a-102c and conveys the captured data to the server computing device 110.

The asset sensor devices 103a-103c can convey the captured temperature data and captured x-y-z coordinate data to the server computing device 110 in a number of different ways. In one embodiment, the asset sensor devices 103a-103c detect a change to either the temperature of the physical asset, the x-y-z coordinate displacement of the physical asset, or both, and capture the changes locally (e.g., in local memory), then periodically transmit the captured temperature data and x-y-z coordinate displacement data to the server computing device 110. In another embodiment, the sensor monitoring module 112a of server computing device 110 periodically polls the asset sensor devices 103a-103c for the captured temperature data and captured x-y-z coordinate data. In yet another embodiment, the asset sensor devices 103a-103c detect a change to either the temperature of the physical asset, the x-y-z coordinate displacement of the physical asset, or both, and transmit the captured temperature data and x-y-z coordinate displacement data to the server computing device 110 in real time.

The reference sensor device 106 captures (304) temperature data associated with the predefined physical area 101 (e.g., a room temperature) and periodically conveys the captured temperature data to the server computing device 110. As can be appreciated, the sensor monitoring module 112a can be configured to poll the reference sensor device 106 for the current temperature of the area 101 periodically and/or in real time as changes occur.

For each asset sensor device 103a-103c, the server computing device 110 performs a number of actions associated with the captured temperature data and x-y-z coordinate displacement data for the asset sensor device. The sensor monitoring module 112a monitors (306) the temperature data and x-y-z coordinate displacement data received from the asset sensor device (e.g., device 103a) for a particular physical asset (e.g., asset 102a). As the sensor monitoring module 112a receives temperature data and x-y-z coordinate displacement data from the asset sensor device 103a over time, the sensor monitoring module 112a can be configured to determine when a change occurs with respect to the temperature data and/or the x-y-z coordinate displacement data—which may indicate operation and/or use of the physical asset 102a.

When the sensor monitoring module 112a detects a change in one or more of the temperature, x-coordinate displacement, y-coordinate displacement, or z-coordinate displacement of the asset sensor device 103a, the trigger evaluation module 112b applies (308) a set of triggers to the temperature data and x-y-z coordinate displacement data to determine whether a change event occurred. In one embodiment, the trigger evaluation module 112b uses a 'truth table' stored in database 114 to apply the triggers to the temperature data and x-y-z coordinate displacement data. In this embodiment, the truth table is an indexed database table where each row comprises a different trigger and each trigger is made up of a set of binary values. Each binary value in a trigger corresponds to one of: the x-coordinate displacement, the y-coordinate displacement, the z-coordinate displacement, the temperature, and the output. In one example, then the x-coordinate displacement data is captured by the asset sensor device 103a and transmitted to the trigger evaluation module 112b, the module 112b determines if x-coordinate displacement has occurred (e.g., the asset sensor device 103a has been displaced from the base location along the x-axis). If it is determined that the device 103a is displaced, the module 112b assigns a binary value of 1 to the x-coordinate displacement. If it is determined that the device 103a is not displaced, the module 112b assigns a binary value of 0 to the x-coordinate displacement. The module 112b performs the same determination for the y-coordinate displacement, the z-coordinate displacement, and the temperature (i.e., determining if temperature has changed), then groups the binary values together into a set. The module 112b then compares the determined binary values against the truth table to determine whether one of the triggers is matched. An exemplary truth table (Table 1) is shown below.

TABLE 1

| index | x-coordinate displacement | y-coordinate displacement | z-coordinate displacement | temperature | output |
|---|---|---|---|---|---|
| 1 | 0 | 0 | 0 | 0 | 0/1 |
| 2 | 0 | 0 | 0 | 1 | 0/1 |
| 3 | 0 | 0 | 1 | 0 | 0/1 |
| 4 | 0 | 1 | 0 | 0 | 0/1 |

TABLE 1-continued

| index | x-coordinate displacement | y-coordinate displacement | z-coordinate displacement | temperature | output |
|---|---|---|---|---|---|
| 5 | 0 | 0 | 1 | 1 | 0/1 |
| 6 | 0 | 1 | 0 | 1 | 0/1 |
| 7 | 0 | 1 | 1 | 0 | 0/1 |
| 8 | 0 | 1 | 1 | 1 | 0/1 |
| 9 | 1 | 0 | 0 | 0 | 0/1 |
| 10 | 1 | 0 | 0 | 1 | 0/1 |
| 11 | 1 | 0 | 1 | 0 | 0/1 |
| 12 | 1 | 1 | 0 | 0 | 0/1 |
| 13 | 1 | 0 | 1 | 1 | 0/1 |
| 14 | 1 | 1 | 0 | 1 | 0/1 |
| 15 | 1 | 1 | 1 | 0 | 0/1 |
| 16 | 1 | 1 | 1 | 1 | 0/1 |

For example, if the x-coordinate displacement has a binary value of 1, the y-coordinate displacement has a binary value of 1, the z-coordinate displacement has a binary value of 1, and the temperature has a binary value of 0, then the module 112b applies these binary values to the set of triggers as shown in the exemplary truth table above to determine that the binary values match the trigger at index 15. The module 112b can then analyze the output value for that trigger to determine whether the binary values constitute an actionable change event that requires a change to the physical asset 102a corresponding to the asset sensor device 103a that captured the displacement and temperature data. As shown above, the output values can be either 0 or 1, where 0 indicates that the trigger does not constitute an actionable change event, while 1 indicates that the trigger does constitute an actionable change event.

It should be appreciated that the truth table can be configured for each asset sensor device 103a, according to the particular requirements and/or conditions of the physical asset 102a. For example, a temperature change and x-coordinate displacement change for an asset sensor device positioned on a particular asset may require an actionable change event, while a temperature change and x-coordinate displacement change for a different asset sensor device positioned on the same asset (or a different asset) may not require an actionable change event.

Also, it should be appreciated that the trigger evaluation module 112b can be configured to generate the binary values for the temperature, x-coordinate displacement, y-coordinate displacement, and z-coordinate displacement based upon predetermined thresholds. For example, the trigger evaluation module 112b can determine that a temperature of an asset sensor device 103b for a particular physical asset 102b has increased by seven degrees, and that a corresponding temperature change threshold for that asset sensor device 103b is set to four degrees. As a result, the module 112b can assign a binary value of 1 to the temperature—meaning that it has exceeded the threshold. If, for example, the temperature of the asset sensor device 103b only changed by two degrees, the module 112b can assign a binary value of 0 to the temperature.

In addition, the functionality of the sensor monitoring module 112a and/or the trigger evaluation module 112b can be located at the individual asset sensor modules 103a-103c and/or on the computing devices 104a-104c associated with the respective asset sensor modules. In this way, the trigger table and associated functionality can be executed locally at the sensor device level, instead of on the server computing device 110—which, for some applications, may result in a distributed data analysis architecture that improves overall responsiveness and processing efficiency of the system 100

(e.g., systems with a large number of assets and sensors, or assets that require advanced analysis of sensor data).

Once the trigger evaluation module 112b has applied the triggers and determined that an actionable change event has occurred, the sensor recording module 112c records (310) the temperature data and x-y-z coordinate displacement data for the corresponding asset sensor device 103a. In some embodiments, the sensor recording module 112c captures the temperature data and x-y-z coordinate displacement data in real time so that constant readings of the corresponding temperature and displacement values are obtained. In some embodiments, the module 112c captures the temperature and displacement data at predetermined intervals (e.g., every second, every five seconds, etc.). In this way, the module 112c captures these values during the period of time in which the physical asset is presumed to be in operation or in use. The module 112c continues the recording process until, e.g., the temperature data associated with the physical asset matches the temperature data associated with the defined physical area and the x-y-z coordinate displacement data associated with the physical asset returns to zero—which indicates that the physical asset is no longer in operation or in use. For example, the module 112c can continuously compare the captured temperature at the asset sensor device 103a with the captured temperature at the reference sensor device 106 (which is in the same general area as the physical asset) to determine when the temperature of the physical asset 102a has returned to the same temperature as the surrounding environment. Likewise, the module 112c can continuously evaluate the captured x-y-z coordinate displacement data to determine when the position and/or location of the asset sensor device 103a has returned to the base location (i.e., 0,0,0). When either or both of these conditions are met, the module 112c can stop recording the relevant temperature data and displacement data.

The information recorded by the sensor recording module 112c is useful for a number of different purposes. The recorded temperature and displacement data can indicate (i) when and how long a particular physical asset is in operation (e.g., timestamp(s) of start and end, duration); (ii) how many times a particular physical asset is in operation over a period of time (e.g., count of actionable change events); and (iii) the operating characteristics or parameters of the physical asset during operation (e.g., recorded temperature and displacement). This information can be used by the instruction generation module 112d to generate instructions for changing one or more operational settings or availability settings of the physical asset (e.g., via the computing device coupled to the asset).

The instruction generation module 112d can evaluate the recorded change event data (as described above) and generate (312) instructions comprising a change to the physical asset 102a based upon the recorded change event data. For example, the module 112d can determine that a particular physical asset 102a has been used more than a certain number of times over a predetermined time period (i.e., 40 uses in the past 24 hours), or the module 112d can determine that a particular physical asset 102a has exceeded a predefined temperature setting for an extended duration. As a result, the physical asset 102a requires a change to its operational settings or availability based upon this use (e.g., a particular function needs to be disabled, a particular function needs to be reset, and/or the asset itself needs to be powered down or taken offline for maintenance). The module 112d generates programmatic instructions implementing this change to the physical asset 102a. For example, the module 112d can generate a file (e.g., XML) that contains the change instructions in a format that is readable and actionable by the physical asset 102a and/or the computing device 104a. The physical asset 102a and/or the computing device 104a may be configured to accept change instructions via a specialized software API or communications protocol—and the module 112d can be programmed to generate change instructions specific to the API/communications protocol used by the asset or computing device. Once the instruction generation module 112d has generated the change instructions, the module 112d transmits (314) the instructions to a remote computing device associated with the physical asset (e.g., computing device 104a coupled to or embedded in the physical asset 102a).

The remote computing device 104a receives the generated instructions from the instruction generation module 112d (e.g., via API or other communications link as described above), and the remote computing device 104a executes (316) the instructions to change the operational state of the physical asset (e.g., operational settings or functions) and/or the availability of the physical asset (e.g., take the asset offline or power the asset off). For example, the remote computing device 104a can receive the instructions via API with specific parameter values that indicate the changes required. The remote computing device 104a can be programmed to apply the changes contained in the instructions to the physical asset 102a itself and/or to a processor, memory, or database that contains instructions for operation of the physical asset 102a (e.g., in cases where the computing device 104a controls the operation of the asset). Once the change instructions are applied, the operation of the physical asset 102a changes accordingly.

The following is an exemplary use case of the methods, systems and techniques described above. In this use case, the physical asset comprises a machine press located in a manufacturing facility. A first asset sensor device is attached to the main operational lever of the machine press, a second asset sensor device is attached to the work surface of the press, and a reference sensor device is placed in the same room as the press. The machine press is coupled to a computing device next to the press, which communicates with the machine press to monitor its operation and control its functionality.

When a user operates the machine press by manipulating the main lever, the first asset sensor device captures temperature data (e.g., the surface of the lever has increased in temperature, indicating that a user is holding it) and x-y-z coordinate displacement data (e.g., the lever is moving away from its base 'off' location, indicating that a user is operating the press). Similarly, the second asset sensor device captures temperature data (e.g., the work surface has increased in temperature, indicating operation of the press) and x-y-z coordinate displacement data (e.g., the work surface is moving or vibrating, indicating operation of the press). The reference sensor device captures the room temperature of the work area (which is different from the temperatures on the lever and on the work surface).

The sensor monitoring module captures the relevant data from the first asset sensor device, the second asset sensor device, and the reference sensor device at the time that the machine press begins to operate. For the first sensor, the sensor monitoring module determines a change in temperature, a change in x-coordinate displacement, a change in y-coordinate displacement, but no change in z-coordinate displacement. The trigger evaluation module receives this data and generates the following set of binary values: (1, 1, 0, 1). The trigger evaluation module then applies a set of triggers stored in the database to the generated binary values, and determines that, for the first asset sensor device, the values match a specific trigger—and thus constitute an actionable change event. The sensor recording module begins recording the temperature, x-coordinate displacement, y-coordinate displacement, and z-coordinate displacement until the respective values return to the baseline levels (e.g., temperature of the lever reaches room temperature and displacement of the lever goes back to 0,0,0), at which point the sensor recording module stops recording.

The instruction generation module analyzes the recorded temperature data and x-y-z coordinate displacement data to determine a start time, an end time, a duration, a temperature level, and a displacement level of the period of use of the lever on the machine press. Based upon this data (and in some embodiments, aggregating this data with historical usage data), the instruction generation module determines that the usage of the machine press requires a change to the operation of the machine press—namely, the usage of the machine press has reached a predetermined number of cycles (or hours) and thus the machine press needs to be taken down for maintenance.

The instruction generation module generates programmatic instructions according to the specifications of an API used by the computing device coupled to the machine press, that instruct the machine press to go offline. The instruction generation module transmits the programmatic instructions via API to the computing device coupled to the machine press, which then executes the instructions and, e.g., either turns off the machine press or locks the machine press (e.g., triggers a physical lock on the lever) so that it cannot be operated until maintenance is complete. It should be appreciated that the above use case is exemplary, and there are other applications and use cases that apply the techniques, methods, and systems described herein.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for monitoring usage of a physical asset to automatically lock the physical asset, the system comprising:
    a plurality of asset sensor devices, each asset sensor device attached to a physical asset in a defined physical area and continuously capturing temperature data and x-y-z coordinate displacement data associated with the physical asset;
    at least one reference sensor device, the reference sensor device continuously capturing temperature data of the defined physical area;
    a server computing device coupled to the plurality of asset sensor devices and the at least one reference sensor device, the server computing device comprising a memory for storing computer-executable instructions and a processor that executes the computer-executable instructions to:
        continuously monitor, for each asset sensor device during one or more time intervals, the captured temperature data and the captured x-y-z coordinate displacement data of the asset sensor device;
        continuously apply, for each asset sensor device during the one or more time intervals, a set of triggers to the captured temperature data and the captured x-y-z coordinate displacement data of the asset sensor device to determine whether a change event occurred for the physical asset, the change event associated with one trigger in the set of triggers;
        record, for each asset sensor device during the one or more time intervals, the temperature data and the x-y-z coordinate displacement data of the asset sensor device when a change event occurred for the physical asset, the recording continuing until the temperature data associated with the physical asset matches the temperature data associated with the defined physical area and the x-y-z coordinate displacement data associated with the physical asset returns to zero;
        determine that the physical asset should be locked based upon the recorded temperature data and the recorded x-y-z coordinate displacement data for each of the asset sensor devices during the one or more time intervals;
        generate instructions comprising a lock event of the physical asset; and
        transmit the instructions to a remote computing device associated with the physical asset,
        the remote computing device executing the instructions to automatically activate a locking mechanism for one or more control devices on the physical asset to render the physical asset inoperable until a maintenance of the physical asset is complete.

2. The system of claim 1, wherein the plurality of asset sensor devices each comprises a wireless beacon with a motion sensor and a temperature sensor.

3. The system of claim 1, wherein each asset sensor device is programmed with base x-y-z coordinates and the x-y-z coordinate displacement data corresponds to a change in x-y-z coordinates of the asset sensor device from the base x-y-z coordinates.

4. The system of claim 1, wherein the server computing device captures temperature data associated with the defined physical area from the reference sensor device at the same time as capturing temperature data associated with the physical asset from the asset sensor device.

5. The system of claim 1, wherein the server computing device stores the set of triggers in a database, each trigger comprising a plurality of binary values, each binary value corresponding to one of: a change in temperature of the physical asset, a change in x-coordinate displacement of the physical asset, a change in y-coordinate displacement of the physical asset, or a change in z-coordinate displacement of the physical asset.

6. The system of claim 1, wherein recording the temperature data and the x-y-z coordinate displacement data of the asset sensor device when a change event occurred for the physical asset comprises:
    storing a current temperature and current x-y-z coordinates of the asset sensor device in a database at each of a plurality of predetermined time intervals.

7. The system of claim 1, wherein the server computing device generates an alert associated with the generated instructions and transmits the alert to a mobile computing device of a user to notify the user of the lock event.

8. The system of claim 3, wherein the base x-y-z coordinates are zero and the x-y-z coordinate displacement data is x-y-z coordinates with at least one non-zero value representing the change in x-y-z coordinates of the asset sensor device from the base x-y-z coordinates.

9. The system of claim 5, wherein applying the set of triggers to the captured temperature data and the captured x-y-z coordinate displacement data of the asset sensor device comprises:
 determining whether a change in temperature exists for the physical asset based upon the captured temperature data;
 determining whether a change in x-coordinate displacement exists for the physical asset based upon the captured x-y-z coordinate displacement data;
 determining whether a change in y-coordinate displacement exists for the physical asset based upon the captured x-y-z coordinate displacement data;
 determining whether a change in z-coordinate displacement exists for the physical asset based upon the captured x-y-z coordinate displacement data;
 generating a binary value for each of the change in temperature determination, the change in x-coordinate displacement determination, the change in y-coordinate displacement determination, and the change in z-coordinate displacement determination;
 comparing the generated binary values to the plurality of binary values for each trigger in the set of triggers to determine whether the binary values of one trigger matches the generated binary values; and
 determining that a change event occurred for the physical asset when the generated binary values matches the binary values of one trigger.

10. The system of claim 6, wherein plurality of predetermined time intervals comprises real-time storing of the current temperature and current x-y-z coordinates of the asset sensor device.

11. A computerized method of monitoring usage of a physical asset to automatically lock the physical asset, the method comprising:
 continuously capturing, by a plurality of asset sensor devices each attached to a physical asset in a defined physical area, temperature data and x-y-z coordinate displacement data associated with the physical asset;
 continuously capturing, by at least one reference sensor device, temperature data of the defined physical area;
 for each asset sensor device:
  continuously monitoring, by a server computing device coupled to the plurality of asset sensor devices and the at least one reference sensor device, during each of one or more time intervals, the captured temperature data and the captured x-y-z coordinate displacement data of the asset sensor device;
  continuously applying, by the server computing device, during each of the one or more time intervals, a set of triggers to the captured temperature data and the captured x-y-z coordinate displacement data of the asset sensor device to determine whether a change event occurred for the physical asset, the change event associated with one trigger in the set of triggers; and
  recording, by the server computing device, during each of the one or more time intervals, the temperature data and the x-y-z coordinate displacement data of the asset sensor device when a change event occurred for the physical asset, the recording continuing until the temperature data associated with the physical asset matches the temperature data associated with the defined physical area and the x-y-z coordinate displacement data associated with the physical asset returns to zero;
 determining, by the server computing device, that the physical asset should be locked based upon the recorded temperature data and the recorded x-y-z coordinate displacement data for each of the asset sensor devices during the one or more time intervals;
 generating, by the server computing device, instructions comprising a lock event of the physical asset;
 transmitting, by the server computing device, the instructions to a remote computing device associated with the physical asset; and
 executing, by the remote computing device, the instructions to automatically activate a locking mechanism for one or more control devices on the physical asset to render the physical asset manually inoperable until a maintenance of the physical asset is complete.

12. The method of claim 11, wherein the plurality of asset sensor devices each comprises a wireless beacon with a motion sensor and a temperature sensor.

13. The method of claim 11, wherein each asset sensor device is programmed with base x-y-z coordinates and the x-y-z coordinate displacement data corresponds to a change in x-y-z coordinates of the asset sensor device from the base x-y-z coordinates.

14. The method of claim 11, wherein the server computing device captures temperature data associated with the defined physical area from the reference sensor device at the same time as capturing temperature data associated with the physical asset from the asset sensor device.

15. The method of claim 11, wherein the server computing device stores the set of triggers in a database, each trigger comprising a plurality of binary values, each binary value corresponding to one of: a change in temperature of the physical asset, a change in x-coordinate displacement of the physical asset, a change in y-coordinate displacement of the physical asset, or a change in z-coordinate displacement of the physical asset.

16. The method of claim 11, wherein recording the temperature data and the x-y-z coordinate displacement data of the asset sensor device when a change event occurred for the physical asset comprises:
 storing, by the server computing device, a current temperature and current x-y-z coordinates of the asset sensor device in a database at each of a plurality of predetermined time intervals.

17. The method of claim 11, wherein the server computing device generates an alert associated with the generated instructions and transmits the alert to a mobile computing device of a user to notify the user of the lock event.

18. The method of claim 13, wherein the base x-y-z coordinates are zero and the x-y-z coordinate displacement data is x-y-z coordinates with at least one non-zero value representing the change in x-y-z coordinates of the asset sensor device from the base x-y-z coordinates.

19. The method of claim 18, wherein applying the set of triggers to the captured temperature data and the captured x-y-z coordinate displacement data of the asset sensor device comprises:

determining, by the server computing device, whether a change in temperature exists for the physical asset based upon the captured temperature data;

determining, by the server computing device, whether a change in x-coordinate displacement exists for the physical asset based upon the captured x-y-z coordinate displacement data;

determining, by the server computing device, whether a change in y-coordinate displacement exists for the physical asset based upon the captured x-y-z coordinate displacement data;

determining, by the server computing device, whether a change in z-coordinate displacement exists for the physical asset based upon the captured x-y-z coordinate displacement data;

generating, by the server computing device, a binary value for each of the change in temperature determination, the change in x-coordinate displacement determination, and the change in y-coordinate displacement determination;

comparing, by the server computing device, the generated binary values to the plurality of binary values for each trigger in the set of triggers to determine whether the binary values of one trigger matches the generated binary values; and determining, by the server computing device, that a change event occurred for the physical asset when the generated binary values matches the binary values of one trigger.

20. The method of claim 16, wherein plurality of predetermined time intervals comprises real-time storing of the current temperature and current x-y-z coordinates of the asset sensor device.

\* \* \* \* \*

UNITED STATES PATENT AND TRADEMARK OFFICE
CERTIFICATE OF CORRECTION

PATENT NO. : 10,476,696 B2
APPLICATION NO. : 15/815328
DATED : November 12, 2019
INVENTOR(S) : Madhani et al.

Page 1 of 1

It is certified that error appears in the above-identified patent and that said Letters Patent is hereby corrected as shown below:

In the Claims

In Claim 11, Column 16, Line 23, delete the word "manually"

In Claim 19, Column 16, Line 64, delete "The method of claim 18" and replace with "The method of claim 15"

Signed and Sealed this
Thirteenth Day of October, 2020

Andrei Iancu
*Director of the United States Patent and Trademark Office*